Patented Feb. 28, 1933

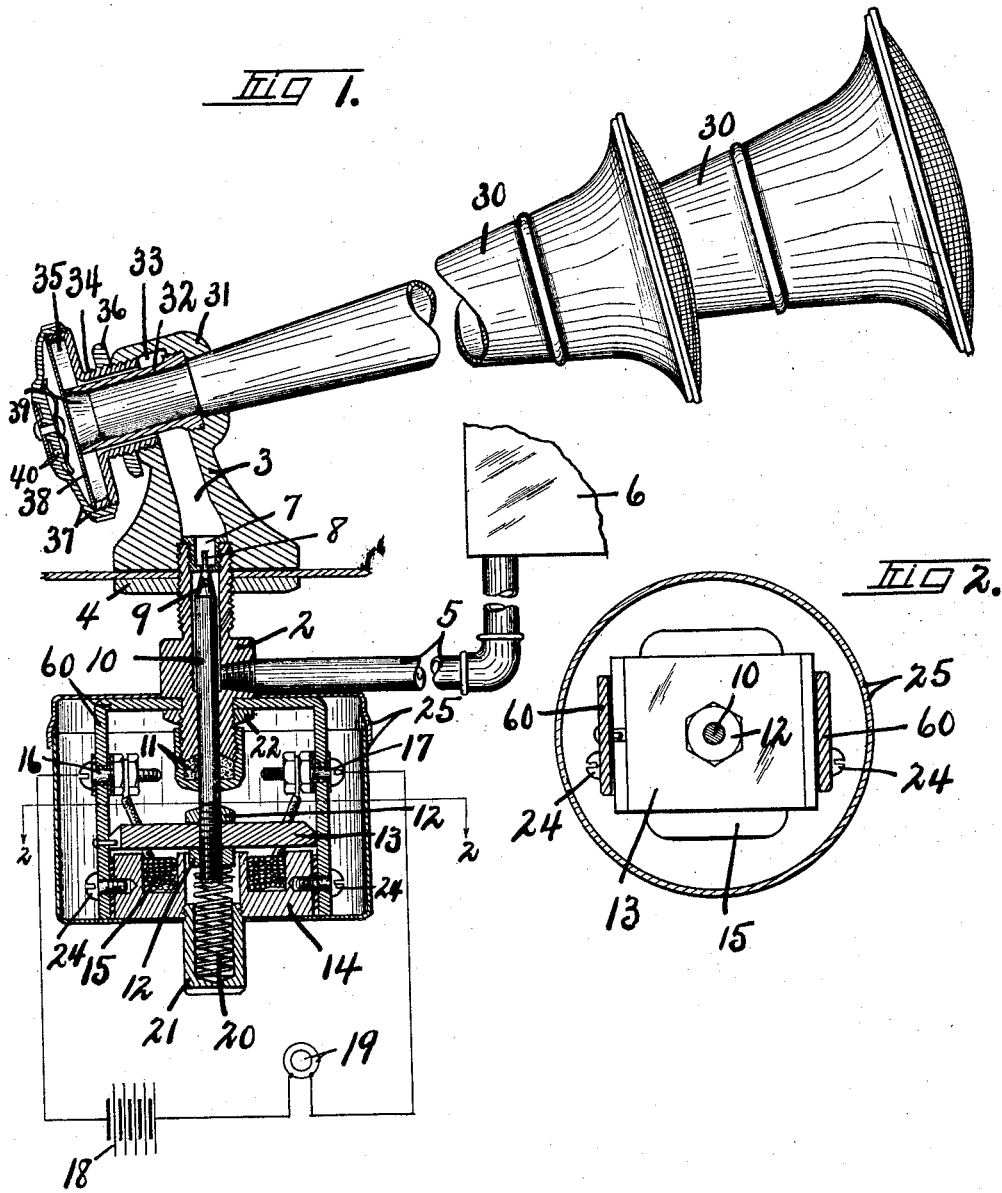

1,899,731

UNITED STATES PATENT OFFICE

THEODORE J. SCOFIELD, LLOYD E. JOHNSON, AND FRED WILLIAM BILLIG, OF JACKSON, MICHIGAN, ASSIGNORS TO THE SPARKS-WITHINGTON COMPANY, OF JACKSON, MICHIGAN, A CORPORATION OF OHIO

SIGNALING DEVICE

Application filed September 19, 1927. Serial No. 220,450.

This invention relates to certain new and useful improvements in signaling devices and more especially to a magnetically actuated valve designed particularly for controlling the operation of an air resonant signaling structure.

In many places and especially on certain vehicles where signaling devices are desirable, a source of air under pressure is already available and the main object of this invention is to produce a signaling device of the air resonant type which may be connected as by a conduit to the source of air under pressure, the communication through such conduit being normally cut off as by a valve, in combination with magnetically-operated means for opening said valve upon the closing of an associated electric circuit, such circuit closer being operable from various remote points as, for instance, the driver's seat of a vehicle.

Other objects and advantages relate to the details of the structure and the form and relation of the parts thereof, all as will more fully appear from the following description taken in connection with the accompanying drawing in which:—

Figure 1 is an elevation, partially in section, of an apparatus of this invention.

Figure 2 is a section on line 2—2, Figure 1.

The apparatus is here illustrated as associated with and connected to the wall —1— which may be the wall of a vehicle body.

This connection may be made as shown by projecting one of the threaded ends of a fitting —2— through an opening in the wall —1— and threading it into the base of the hollow horn body —3—, a lock nut —4— being provided for clamping the parts rigidly and tightly together.

The fitting —2— is of tubular form and of two different interior diameters, the upper portion illustrated in the drawing being of the larger diameter and a pipe or conduit —5— penetrates the wall of the fitting so as to communicate with the portion of larger diameter and this conduit may lead to any source for supplying air under pressure to the conduit and to the interior of the fitting through the conduit. As here shown it is connected to a tank —6— such as may be provided upon vehicles utilizing air for braking or other purposes.

The upper end of the fitting —2— is closed by a valve seat —7— except for a comparatively small opening which penetrates the base of the valve seat and is adapted to receive the reduced end portion —8— of a tapered valve —9— adapted to contact with the seat —7— so as to close the opening therethrough and shut off communication between conduit —5— and the interior of the hollow horn body —3—.

The valve —9— is carried by an elongated stem —10— which extends outwardly and in the illustration, downwardly through the fitting —2— and is of an exterior diameter substantially equal to the interior diameter of that portion of the fitting which is of lesser interior diameter.

Where the stem —10— passes out from the fitting —2— an air-tight connection is made as by a stuffing box —11— which still permits reciprocation of the stem —10— in the fitting —2— to carry valve —9— into and out of engagement with its seat —7—.

The lower or outer end of the stem —10— is connected in any suitable manner as by nuts —12— to an armature —13— associated with an electromagnet which may, as illustrated, consist of a metallic field —14— and a field coil —15—, the terminals —16— and —17— of which are connected in circuit with a suitable source of potential as, for instance, battery —18— and a circuit breaker —19— which may be in the form of an ordinary push button adapted for mounting upon the steering column of a vehicle.

The armature —13— is normally maintained spaced from the field —14— and the valve —9— is normally maintained closed as by spring —20— disposed between the nut —12— and the inner end of a cup —21— threaded into a central opening in the field magnet —14—.

When the coil —15— is energized so as to energize the field magnet —14— by closing of the circuit described, the armature —13— is drawn downwardly toward the field magnet —14— to move valve —9— from contact with its seat. Immediately the circuit is broken spring —20— closes the valve by moving it into contact with its seat.

The field magnet —14— may be carried in any suitable manner as, for instance, by a U-shaped sheet metal case —60— secured in any suitable manner to the fitting as by nut —22— and having its legs extending downwardly upon opposite sides of the magnet —14— and insulated from the magnet as illustrated, but supporting and carrying the magnet —14— through any suitable connection as screws —24—.

This portion of the structure may be inclosed in any suitable manner as by a two-part sheet metal casing —25—.

It will be apparent that with this structure communication between the source of supply of air under pressure and the horn body —3— may be made or may be cut-off by the mere operation of the switch or circuit closer —19—.

Any suitable air resonant structure may be associated with the horn body —3— for producing a signal of desired character or a number of air resonant devices may be associated with the horn body and all adapted to receive fluid under pressure therefrom for the production, if desired, of notes of varying pitch and adapted to produce musical tones of harmonic character.

As here illustrated, two such air resonant devices are contemplated and as their construction is identical except as to size, a description of one will constitute a description of both.

The projector —30— has its rear end threaded into or otherwise secured in the front side of the boss —31— formed at the upper end of the horn body and a tube —32— is threaded into the boss —31— so as to substantially contact with the rear end of the projector —30— and this tube projects rearwardly from the boss —31—. The boss has a circumferentially enlarged intermediate portion forming an annular chamber —33— surrounding the tube —32— and in communication with the interior of the hollow horn body —3—.

The rear end of the boss —31— is internally enlarged with respect to the front end and is threaded for the reception of an externally threaded tubular boss —34— formed concentrically at the base of a cup-shaped member —35— constituting the front wall of a diaphragm chamber.

The boss —34— may be locked in any desired position with respect to the boss —31— by means of a lock nut —36—.

The internal diameter of the boss —34— is somewhat greater than the external diameter of the tube —32— so as to form an annular passage-way around the tube —32— leading from chamber —33— to the interior of the cup-shaped member —35—. The external wall of the cup-shaped member —35— is externally threaded for cooperative engagement with the interiorly threaded flange upon a cup-shaped cap —37— and this cap —37— is adapted to clamp between its end the rear edge of the cup-shaped member —35—, a thin flexible metallic diaphragm —38—.

The size and arrangement of the parts is such that when the diaphragm is positioned as described it extends across and normally closes the rear open end of the tube —32— and preferably the rear open end of tube —32— is flared as indicated at —39—.

It is found that the air in the chamber between the diaphragm —38— and cap —37— varies in pressure somewhat in accordance with the temperature to which the device is subject thereby varying the pressure upon the diaphragm —38— which in turn effects the operation of the signaling device and, in order to maintain the device uniform in operation, the cap —37— is provided with one or more openings —40— to permit the entrance of air or the exit of air to or from the interior space.

For the purpose of illustration we have described a desirable form of air resonant device and have illustrated two of such devices, varying in the fact that their projectors —30— are of different sizes, the parts being arranged for the purpose of producing two musical tones of harmonic character.

However, it will be apparent that various other forms of air resonant devices may be substituted for those shown so long as a valve magnetically actuated as by connection to the armature of an electromagnet is utilized for controlling the flow of air from a source of air under pressure to the air resonant device or devices and various changes and modifications may be made in the form, relation and construction of the parts of the device without departing from the invention as set forth in the appended claims.

We claim:

1. In a device of the class described, a casing having opposed openings, an apertured boss secured in one of said openings, one end of the aperture in the boss having a greater cross sectional area than the other end, a valve seat at the outer end of the larger end of such aperture, a source of air under pressure, a conduit leading from the larger end of such aperture to the source of air under pressure, a valve stem having a valve at one end adapted to seat in the valve seat slidably mounted in the smaller end of the aperture in the boss and extending into the larger end of such aperture, an armature on the valve stem, an electric magnet surrounding the second opening in the casing, a cup secured in such opening, a spring seated in the cup and adapted to releasably hold the valve to its seat, and means for energizing the magnet whereby the valve will be moved from its seat.

2. In a device of the class described, a casing having opposed openings, an apertured boss secured in one of said openings, one end of the aperture in the boss having a greater cross sectional area than the other end, a valve seat at the outer end of the larger end of such aperture, a source of air under pressure, a conduit leading from the larger end of such aperture to the source of air under pressure, a valve stem having a valve at one end adapted to seat in the valve seat slidably mounted in the smaller end of the aperture in the boss and extending into the larger end of such aperture, a packing surrounding the valve stem and secured against the inner end of the boss, an armature on the valve stem, an electric magnet surrounding the second opening in the casing, a cup secured in such opening, a spring seated in the cup and adapted to releasably hold the valve to its seat, and means for energizing the magnet whereby the valve will be moved from its seat.

In witness whereof we have hereunto set our hands this 6th day of September 1927.

THEODORE J. SCOFIELD.
LLOYD E. JOHNSON.
FRED WILLIAM BILLIG.